United States Patent [19]

Brigham et al.

[11] Patent Number: 4,924,679
[45] Date of Patent: May 15, 1990

[54] APPARATUS AND METHOD FOR EVACUATING AN INSULATED CRYOGENIC HOSE

[75] Inventors: William D. Brigham; Eugene B. Zwick, both of Huntington Beach, Calif.

[73] Assignee: Zwick Energy Research Organization, Inc., Huntington Beach, Calif.

[21] Appl. No.: 415,787

[22] Filed: Oct. 2, 1989

[51] Int. Cl.⁵ ............................................. F17C 13/00
[52] U.S. Cl. ....................................... 62/50.7; 62/384; 165/32
[58] Field of Search ................... 62/50.7, 467, 45.1, 62/384; 165/32

[56] References Cited

U.S. PATENT DOCUMENTS 2,938,359  5/1960  Cobb, Jr. et al. ..................... 62/54.3
3,777,501 12/1973  Sharp et al. ........................... 62/50.7

Primary Examiner—Ronald C. Capossela
Attorney, Agent, or Firm—William H. Pavitt, Jr.; Mario A. Martella; Ralf H. Siegemund

[57] ABSTRACT

A flexible cryogenic hose is comprised of an inner cryogenic tube surrounded by a concentric heat shield, a closed concentric chamber and an outer protective jacket. At normal ambient temperatures the chamber is completely filled with carbon dioxide gas. As cryogenic liquid is pumped through the inner cryogenic tube, heat is transferred from all structures within the hose, including in particular the carbon dioxide gas in the closed chamber, which runs the length of the cryogenic tube. As the carbon dioxide gas is cooled, it liquefies, thereby substantially evacuating the chamber. The chamber has sufficient structural rigidity to avoid collapse at normal atmospheric pressures. After the cryogenic hose is used, cryogenic flow ceases and the hose warms. In warming, carbon dioxide gas in the chamber gassifies and again refills the chamber. As a result, outgassing from flexible or plastic material from which the hose is made into the chamber, while it is evacuated, is substantially avoided even after repeated cycles of use. Materials particularly adapted for use in flexible hoses, which are normally unsuitable because of their outgassing characteristics for use in vacuum insulated hoses, now become satisfactory materials for use.

20 Claims, 1 Drawing Sheet

APPARATUS AND METHOD FOR EVACUATING AN INSULATED CRYOGENIC HOSE

BACKGROUND OF THE INVENTION

1. Field of the Invention

The invention relates to the field of cryogenic hoses and in particular to cryogenic hoses which are insulated by a vacuum jacket and the method for creating vacuums in such hoses.

2. Description of the Prior Art

Cryogenic fluids are transferred through hoses for many applications in may different types of industries, including the nuclear industry. In many cases, the application in which the cryogenic fluid must be used is located at some distance away from the source of cryogenic fluid. Therefore, if effective transfer is to occur between the source and the site of application, the hose must be well insulated to avoid the absorption of ambient heat into the cryogenic fluid being transferred into the flowing cryogenic fluid and thereby loss or degradation of the cryogenic fluid.

Insulated cryogenic hoses often include some type of insulating filler or fiber between the inner tube which conveys the cryogenic fluid and an outer protective jacket. Such filler typically includes material having a high thermal resistivity such as urethane foam insulation in combination one or more heat shielding layers.

However, the thermal resistivity of even the best fillers is relatively low and limits the practical length that can be utilized for such an insulated hose. Far better thermal insulation is obtained by vacuum jacketing. Therefore, cryogenic hose has been developed in which the tube carrying the cryogenic liquid is surrounded by a vacuum. However, in order to maintain a high vacuum within a jacket within a flexible or semiflexible hose, which is subjected to sometimes rough handling, is extremely difficult.

In addition, plastic and various types of synthetic materials are highly desirable if the flexibility of the hose is to be maintained. While good vacuums can be obtained in metallic jacketed hoses, the weight and rigidity of such materials makes such cryogenic hoses difficult to handle in long runs where the hose must be manipulated during use. The use of plastics or synthetic materials would lighten the hose and render it substantially more flexible, but outgassing from plastic materials is an inherent quality of these types of materials which ultimately leads to degradation of the vacuum and loss of its insulating quality. As a result, cryogenic vacuum jacketed hose having synthetic casing material must be maintained under vacuum by continual pumping or at least frequently re-evacuated.

Therefore, what is needed is a design for vacuum jacketed cryogenic hosing which overcomes each of these defects of the prior art.

BRIEF SUMMARY OF THE INVENTION

The invention is a cryogenic hose or pipe for use in ambient environments comprising a cryogenic tube for conducting the flow of a cryogenic fluid at a cryogenic temperature. An insulating chamber is thermally coupled with the cryogenic tube and insulates the cryogenic tube from the ambient environments. A predetermined fluid is disposed in the chamber. The predetermined fluid is gaseous at ambient temperatures and liquefies or solidifies at the cryogenic temperature. Heat is conducted from the predetermined fluid disposed in the chamber into the cryogenic tube causing the predetermined fluid to liquefy. When the fluid liquefies the chamber is substantially evacuated.

As a result, the hose or pipe provides for delivery of the cryogenic fluid without the need for complex joints and connections, or for repeated evacuation of the insulation chamber by external pumping.

In the preferred embodiment the predetermined fluid is carbon dioxide. The hose has a longitudinal length and central axis. The cryogenic tube is disposed on the central axis of the longitudinal length of the hose. The chamber is a longitudinal cylindrical closed chamber concentric about the cryogenic tube. A heat shield is thermally located between the cryogenic tube and chamber to minimize heat radiation between the cryogenic tube and the tube enclosing the chamber.

In general, the predetermined fluid gassifies at a higher temperature than the cryogenic fluid and conversely liquefies or solidifies at a higher temperature than the cryogenic fluid.

The hose further comprises a cylindrical jacket having a longitudinal length concentric with the longitudinal length of the cryogenic tube. The jacket is disposed outside of the cryogenic tube and chamber and provides a predetermined degree of structural and mechanical rigidity and protection.

The invention is also characterized as a method for transferring a cryogenic fluid at a cryogenic temperature comprising the steps of flowing the cryogenic fluid at the cryogenic temperature through a cryogenic tube thermally coupled to and thermally isolated by a closed chamber filled with a fluid having a liquefaction or solidification temperature at or above the cryogenic temperature. Heat is transferred from the fluid in the chamber to the cryogenic fluid flowing through the cryogenic tube. The fluid is liquefied within the chamber which causes an effective evacuation of the chamber.

Flow of the cryogenic fluid is continued through the cryogenic tube. The transfer of heat from outside the the hose through the chamber and into the cryogenic tube is substantially avoided after evacuation of the chamber by liquefaction or solidification of the fluid therein.

As a result, the cryogenic fluid is transferred after liquefaction or solidification of the fluid and the evacuation of the chamber without substantial heat transfer into the cryogenic fluid.

The method further comprising the steps of ceasing flow of cryogenic fluid through the cryogenic tube, and gassifying the fluid within the chamber to substantially destroy the vacuum within the chamber.

The step of gassifying the fluid gassifies the fluid to a positive pressure within the thermal chamber to reduce outgassing of the materials comprising the walls of the chamber into the chamber.

The method further comprising the steps of reflowing the cryogenic fluid at the cryogenic temperature through a cryogenic tube; retransferring heat from the fluid in the chamber to the cryogenic fluid flowing through the cryogenic tube; and reliquefying or resolidifying the fluid within the chamber to reevacuate the chamber.

In one embodiment, the invention is still further characterized as a flexible cryogenic hose for the transfer of a cryogenic liquid therethrough comprising a flexible inner axial cryogenic tube for containment of flowing cryogenic fluid. A flexible, closed chamber is disposed in thermal contact with the cryogenic tube and is concentric therewith. A liquefiable or solidifiable gas is disposed in the closed chamber. The cryogenic fluid flows through the cryogenic tube, absorbing heat from the liquefiable or solidifiable gas in the chamber to liquefy or solidify the gas to evacuate the closed chamber. The closed chamber has sufficient structural rigidity to withstand the vacuum within the chamber under atmospheric pressures.

The flexible cryogenic hose further comprises a concentric protective flexible jacket disposed about the chamber.

The invention and its various embodiments are best visualized by turning to the following drawings.

DETAILED DESCRIPTION OF THE PREFERRED EMBODIMENT

A flexible cryogenic hose is comprised of an inner cryogenic tube surrounded by a concentric heat shield, a closed concentric chamber and an outer protective jacket. At normal ambient temperatures the chamber is completely filled with carbon dioxide gas. As cryogenic liquid is pumped through the inner cryogenic tube, heat is transferred from all structures within the hose, including in particular the carbon dioxide gas in the closed chamber, which runs the length of the cryogenic tube. As the carbon dioxide gas is cooled at normal pressures, it solidifies, thereby substantially evacuating the chamber. The chamber has sufficient structural rigidity to avoid collapse at normal atmospheric pressures. After the cryogenic hose is used, cryogenic flow ceases and the hose warms. In warming, carbon dioxide gas in the chamber gassifies and again refills the thermal chamber. As a result, outgassing from flexible or plastic material from which the hose is made into the chamber, while it is evacuated, is substantially avoided even after repeated cycles of use. Materials particularly adapted for use in flexible hoses, which are normally unsuitable because of their outgassing characteristics for use in vacuum insulated hoses, now become satisfactory materials for use.

Figure 1:
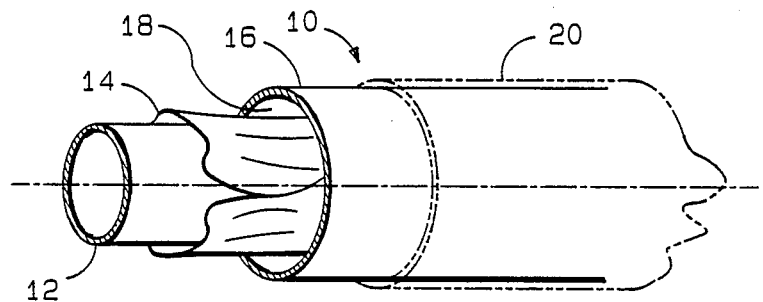
FIG. 1 is a diagrammatic, partially cutaway, perspective view of a cryogenic hose incorporating the invention.

FIG. 1 is a perspective cutaway view of a section of hose according to the invention wherein an inner tube 12 is provided to carry the flow of cryogenic fluid. In the illustrated embodiment inner tube 12 carries liquid nitrogen, although other cryogenic fluids and mixtures of fluids could be transported as well. In the preferred embodiment, the inner tube is comprised of Teflon with ½" inner diameter and 9/16" outer diameter. The annulus between inner tube 12 and an outer tube 16 is at least partially filled with with a thermal radiation shield 14, such as wrinkled reflectorized foil sheet.

In another embodiment a triaxial hose may be used wherein an inner tube 12 such as disclosed above is disposed inside of a concentric second tube. In such a case, the second tube is Teflon sleeving which slips over inner tube 12 and has an inner diameter of ⅝" and an outer diameter of 11/16". The second tube 14 is coated with reflectorized or metallized surface to optimize its heat shielding qualities and provides an annular space for the flow of cold gas or a mixture of cryogenic liquid and gas.

Returning to the coaxial hose design depicted in the drawings, an outer tube 16 is concentrically disposed about inner tube 12 and radiation shield 14 and spaced therefrom to create a concentric annulus 18 which is evacuated as described below. Outer tube 16 is maintained in a spaced apart relationship from inner tube 12 by means of a periodic placement of conventional spacers (not shown) which extend between tubes 12 and 16, but which spacers allow annulus 18 to be open or freely communicated along its longitudinal length.

If desired, a jacket 20 may then be disposed outside and snugly fit over outer tube 16 to provide for structural reinforcement and protection against rough handling. Typically, jacket 20 is comprised of stainless steel and has a wall thickness of 1/16 inch. The structural configuration of jacket 20 may be corrugated, ribbed, smooth or devised in any one of several configurations to have the desired structural quality or rigidity.

Figure 2:
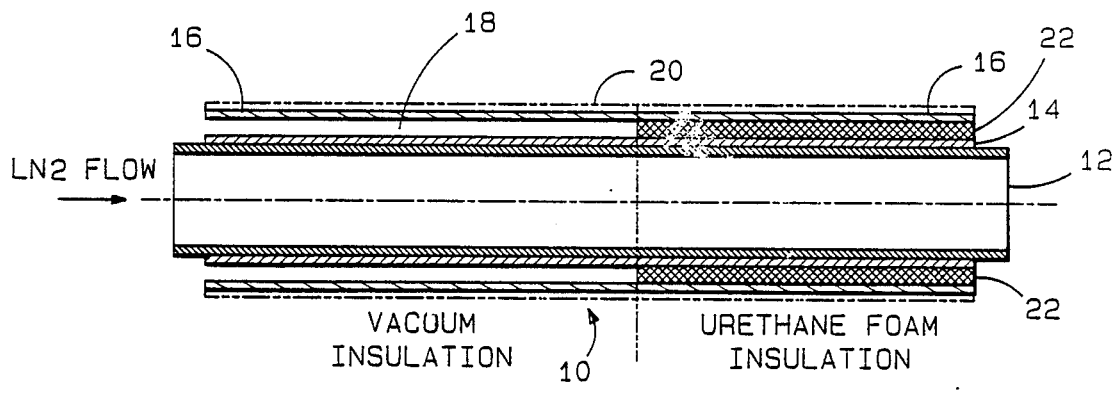
FIG. 2 is a longitudinal cross-sectional view of the host of FIG. 1 showing an end termination whereby the hose is sealed.

Hose 10 as depicted in FIG. 1 is evacuated as best shown in longitudinal cross-sectional view in FIG. 2. The annulus 18 within hose 10 is completely flushed with carbon dioxide gas. Annulus 18 of hose 10 is sealed in a conventional manner. Inner tube 12 is, of course, left free for communication of the cryogenic fluid therethrough.

Again, in the illustrated embodiment, annulus 18 is filled to a slight positive pressure with carbon dioxide gas, all remaining ambient gases having been flushed therefrom. Pressures of 2 to 5 psig are effective.

Hose 10 is now completed and ready for use. When cryogenic liquid is pumped through inner tube 12 heat is drawn through tube 12 by conduction from the carbon dioxide gas within annulus 18. This cools the carbon dioxide gas ultimately to the point of solidification. For example, liquid nitrogen has a boiling point of approximately $-320$ degrees F., whereas the solidification point of gaseous carbon dioxide is $-109$ degrees F. Within a very short time, depending upon the size of hosing and the flow rate of liquid nitrogen, substantially all of the carbon dioxide gas within annulus 18 has been solidified. The result is that a vacuum is formed within hose 10 within a short time after liquid nitrogen is pumped therethrough. A vacuum of less than one micron of mercury is easily obtained and maintained during the usage of hose 10 without any auxiliary pumping or additional measures taken to achieve evacuation.

The time period during which usage of hose 10 is made is typically much less than that required for significant outgassing to occur from synthetic materials from which hose 10 may be made. Therefore there is no measurable degradation of the vacuum during use.

After hose 10 is used, it gradually warms to ambient temperatures and the gas within annulus 18 revaporizes. This recreates a positive pressure within annulus 18 such that virtually no outgassing occurs into annulus 18 during the time intervals in which hose 10 may be stored between uses.

The next time hose 10 is utilized, the gaseous carbon dioxide is again solidified, the vacuum drawn and the hose thermally insulated for continued cryogenic use. Continued reuses do not cause any significant outgassing into annulus 18 thus avoiding any cyclic degradation in the insulating qualities of the hose.

Many modifications and alterations may be made by those having ordinary skill in the art without departing from the spirit and scope of the invention. For example, the use of carbon dioxide gas has been cited for filling annulus 18, but it is entirely within the scope of the invention that other liquefiable or solidifiable gases may be used including organic gases now known or later devised.

Therefore, the illustrated embodiment must be understood as being set forth only for the purposes of example and not as limiting the invention which is defined in the following claims:

We claim:

1. A cryogenic hose for use in ambient environments comprising:
   a cryogenic tube for conducting the flow of a cryogenic fluid at a cryogenic temperature;
   an insulating chamber thermally coupled with said cryogenic tube for insulating said cryogenic tube; and
   a predetermined fluid disposed in said chamber, said predetermined fluid being gaseous at ambient temperatures and liquefying or solidifying at said cryogenic temperature, heat conducted from said predetermined fluid disposed in said chamber into said cryogenic tube causing said predetermined fluid to liquefy or solidify, thereby substantially evacuating said chamber, said evacuated chamber thermally insulating said cryogenic tube from said ambient environments,
   whereby said hose provides for delivery of said cryogenic fluid without the need for repeated evacuation of said chamber by external pumping.

2. The hose of claim 1 wherein said predetermined fluid is carbon dioxide.

3. The hose of claim 1 wherein said hose has a longitudinal length and central axis and wherein said cryogenic tube is disposed on the central axis of said longitudinal length of said hose, said chamber being a longitudinal cylindrical closed chamber concentric about said cryogenic tube.

4. The apparatus of claim 3 further comprising heat shield means disposed thermally coupled with said cryogenic tube and chamber to facilitate heat conduction between said cryogenic tube and chamber.

5. The hose of claim 4 wherein said predetermined fluid is carbon dioxide.

6. The hose of claim 4 wherein said predetermined fluid gassifies at a higher temperature than said cryogenic fluid and conversely liquefies or solidifies at a higher temperature than said cryogenic fluid.

7. The hose of claim 4 further comprising a cylindrical jacket having a longitudinal length concentric with said longitudinal length of said cryogenic tube, said jacket disposed outside of said cryogenic tube and chamber for providing a predetermined degree of structural and mechanical rigidity and protection.

8. The apparatus of claim 1 further comprising heat shield means disposed thermally coupled with said cryogenic tube and chamber to facilitate heat conduction between said cryogenic tube and chamber.

9. The hose of claim 1 wherein said predetermined fluid gassifies at a higher temperature than said cryogenic fluid and conversely liquefies or solidifies at a higher temperature than said cryogenic fluid.

10. The hose of claim 9 wherein said predetermined fluid is carbon dioxide.

11. A method for transferring a cryogenic fluid at a cryogenic temperature comprising the steps of:
    flowing said cryogenic fluid at said cryogenic temperature through a cryogenic tube thermally coupled to and thermally isolated by a closed chamber filled with a fluid having a liquefaction or solidification temperature at or above said cryogenic temperature;
    transferring heat from said fluid in said chamber to said cryogenic fluid flowing through said cryogenic tube;
    liquefying or solidifying said fluid within said chamber to evacuate said chamber; and
    continuing to flow said cryogenic fluid through said cryogenic tube, the transfer of heat from outside said said hose through said chamber and into said cryogenic tube being substantially reduced after evacuation of said chamber by liquefaction or solidification of said fluid,
    whereby said cryogenic fluid is transferred after liquefaction or solidification of said fluid and the evacuation of said chamber without substantial heat transfer into said cryogenic fluid.

12. The method of claim 11 wherein in said step of transferring heat into said cryogenic liquid flowing through said cryogenic tube from said fluid disposed in said chamber, heat is transferred from gaseous carbon dioxide disposed in said chamber.

13. The method of claim 11 further comprising the steps of:
    ceasing flow of cryogenic fluid through said cryogenic tube; and
    gassifying said fluid within said chamber to substantially destroy said vacuum within said chamber.

14. The method of claim 13 where said step of gassifying said fluid gassifies said fluid to a positive pressure within said chamber to reduce outgassing into said chamber.

15. The method of claim 13 further comprising the steps of:
    reflowing said cryogenic fluid at said cryogenic temperature through a cryogenic tube;
    retransferring heat from said fluid in said chamber to said cryogenic fluid flowing through said cryogenic tube;
    reliquefying or resolidifying said fluid within said chamber to reevacuate said chamber.

16. The method of claim 15 where said step of gassifying said fluid gassifies said fluid to a positive pressure within said chamber.

17. A flexible cryogenic hose for the transfer of a cryogenic liquid therethrough comprising:
    a flexible inner axial cryogenic tube for containment of flowing cryogenic fluid;
    a flexible, closed chamber disposed in thermal contact with said cryogenic tube and concentric therewith; and
    a liquefiable or solidifiable gas disposed in said closed chamber, said cryogenic fluid flowing through said cryogenic tube absorbing heat from said liquefiable or solidifiable gas in said chamber to liquefy or solidify said gas to evacuate said closed chamber, said closed chamber having sufficient structural rigidity to withstand said vacuum within said chamber under atmospheric pressures.

18. The flexible cryogenic hose of claim 17 further comprising a flexible heat shield disposed between said cryogenic tube and chamber, said flexible heat shield being concentric with said cryogenic tube and in thermal contact with said cryogenic tube and chamber.

19. The flexible cryogenic hose of claim 18 further comprising a concentric protective flexible jacket disposed about said chamber.

20. The flexible hose of claim 19 wherein said liquefiable or solidifiable gas is carbon dioxide, said carbon dioxide being disposed within said chamber at a pressure greater than atmospheric pressure.

* * * * *